United States Patent
Hamilton, II et al.

(10) Patent No.: US 8,032,799 B2
(45) Date of Patent: Oct. 4, 2011

(54) SYSTEM AND METHOD FOR MANAGING SERVER PERFORMANCE DEGRADATION IN A VIRTUAL UNIVERSE

(75) Inventors: Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 12/212,399

(22) Filed: Sep. 17, 2008

(65) Prior Publication Data

US 2010/0070807 A1   Mar. 18, 2010

(51) Int. Cl.
*G06F 11/00* (2006.01)
(52) U.S. Cl. .......................... 714/57; 718/105
(58) Field of Classification Search .......................... None
See application file for complete search history.

(56) References Cited

U.S. PATENT DOCUMENTS

| | | | |
|---|---|---|---|
| 6,560,717 B1* | 5/2003 | Scott et al. ........................ | 714/4.1 |
| 6,705,945 B2* | 3/2004 | Gavin et al. ........................ | 463/31 |
| 7,383,331 B2 | 6/2008 | Takahashi et al. | |
| 7,415,529 B2 | 8/2008 | Saunders et al. | |
| 7,703,102 B1* | 4/2010 | Eppstein et al. ............... | 718/104 |
| 2002/0142843 A1* | 10/2002 | Roelofs ........................... | 463/42 |
| 2003/0131092 A1* | 7/2003 | McGee et al. .................. | 709/224 |
| 2003/0231610 A1* | 12/2003 | Haddad ........................... | 370/338 |
| 2004/0078657 A1* | 4/2004 | Gross et al. ...................... | 714/15 |
| 2004/0090450 A1 | 5/2004 | Gill et al. | |
| 2004/0215768 A1 | 10/2004 | Oulu et al. | |
| 2005/0228856 A1* | 10/2005 | Swildens et al. ............... | 709/200 |
| 2006/0080409 A1* | 4/2006 | Bieber ........................... | 709/220 |
| 2006/0190284 A1 | 8/2006 | Jung et al. | |
| 2006/0190484 A1* | 8/2006 | Cromer et al. ............. | 707/104.1 |
| 2007/0011498 A1* | 1/2007 | Shaffer et al. ................... | 714/48 |
| 2007/0143119 A1 | 6/2007 | Jung et al. | |
| 2008/0061960 A1* | 3/2008 | Tamura .................... | 340/539.11 |
| 2008/0186862 A1* | 8/2008 | Corbett et al. ................ | 370/237 |
| 2008/0195745 A1 | 8/2008 | Bowra et al. | |
| 2008/0195755 A1 | 8/2008 | Lu et al. | |
| 2008/0195955 A1 | 8/2008 | Salesky et al. | |

OTHER PUBLICATIONS

Chen et al., "A dynamic load balancing model for the multi-server online game systems", 2004.*
Lees, Jennie, "The Five Stages of Server Shutdown", Jul. 2, 2006.*
Wu et al., "A Model for Massively Multiplayer Role-playing Games System Performance", 2006.*
Assiotis et al., "A Distributed Architecture for MMORPG", 2006.*
Ahmed et al., "A Microcell Oriented Load Balancing Model for Collaborative Virtual Environments", 2008.*

* cited by examiner

*Primary Examiner* — Gabriel Chu
(74) *Attorney, Agent, or Firm* — William E. Schiesser; Ronald A. D'Alessandro; Keohane & D'Alessandro PLLC

(57) ABSTRACT

A system and method for managing server performance degradation in a virtual universe environment having avatars has a server load detection unit for detecting server load and a failure notification unit for notifying the avatars of imminent server failure. The server load detection unit measures the wall time of the server for determining performance. A memory stores acceptable performance parameters so that if the server is performing unacceptably, the failure notification unit may notify the avatars.

20 Claims, 13 Drawing Sheets

SYSTEM AND METHOD FOR MANAGING SERVER PERFORMANCE DEGRADATION IN A VIRTUAL UNIVERSE

FIELD OF THE INVENTION

Aspects of the present invention provide a system and method for managing server performance degradation in a virtual world environment. Using an embodiment of the present invention, the system and method allow servers to detect overload and take actions to prevent overload conditions from disabling the server.

BACKGROUND OF THE INVENTION

A virtual universe (VU) is a computer-based simulated environment intended for its residents represented by avatars to traverse, inhabit, and interact through the use of the avatars. Many VUs are represented using three-dimensional (3D) graphics and landscapes, and are populated by many thousands of users, known as "residents." Often, a VU resembles the real world, such as in terms of utilizing the laws of physics, and the use of houses and landscapes.

A computer avatar is a personalized graphic file or rendering that represents a computer user, or resident. These avatars are usually depicted as textual, two-dimensional, or three-dimensional graphical representations, although other forms are possible (auditory and touch sensations for example).

There may be multiple virtual universes. One such virtual universe is provided by Second Life. Second Life is an Internet-based virtual universe launched in 2003, developed by Linden Research, Inc. (commonly referred to as Linden Lab). Second Life® is a trademark of Linden Research, Inc.

In some implementations of a virtual universe, a single server may be assigned one or more regions of land within the virtual universe. For the assigned region(s), the server may perform calculations for activities within each respective region. Activities include, but are not limited to, identifying and describing the current geometry of the visible region for each resident, transmitting required textures for region rendering, streaming media such as music or video and transitioning clients to/from other servers as residents move between regions served by the other servers. (A client may be considered to be a computer system operated by a user to access a VU.) Due to the inherent nature of virtual universe activities, such as teleporting, the number of residents can quickly shift to one region and one corresponding server. If the server does not have enough computing resources available for the number of residents in the region, users of the VU may notice service degradation or, alternatively, a server failure may occur.

Further compounding the server overload problem is that most embodiments of VU servers are applications running within a multitasking operating system such as a Microsoft Windows® operating system, a Linux® operating system, or a Unix® operating system. (Windows is a registered trademark of Microsoft Corporation. Linux is a registered trademark of Linus Torvalds. Unix is a registered trademark of The Open Group.) Due to the multitasking nature of these operating systems, processes outside of the VU server software utilized for managing the assigned VU regions may use server processing unit resources resulting in less resources available to the VU server which may already be over-tasked. Present solutions to server overload in general include techniques such as server clustering, task prioritization, and resource provisioning.

SUMMARY OF THE INVENTION

In general, aspects of the present invention provide a system and a method for managing server performance degradation in a virtual world environment. The present invention provides a system and a method that allow servers to detect overload and that take actions to prevent overload conditions from disabling the server. Additionally, if these detection and prevention actions are unable to prevent the failure, the system and method of the present invention may warn residents located within overloaded VU server's region(s) of impending server failure.

One embodiment of the present invention is a method for managing server service degradation in a virtual universe (VU) having one or more regions, the VU having at least one VU server assigned to serve the one or more regions, at least one of the regions having one or more residents therein, the method comprising: determining server load on a VU server; determining whether the server load has exceeded a prespecified server load threshold; if the server load has exceeded the prespecified server load threshold, reducing the server load; determining if a server failure is imminent; and, if a server failure is imminent, providing a notification to the residents of the one or more regions.

Another embodiment may be a system in a virtual universe (VU) server having a system for managing server performance degradation in a virtual world environment in a virtual universe (VU) having one or more avatars, the VU server for managing activity of the one or more residents, the system comprising: a server load detection unit; a memory, the memory having thresholds that specify acceptable server performance degradation characteristics, wherein the server load detection unit uses the thresholds to determine whether the VU server performance has degraded below an acceptable threshold.

In another embodiment, a computer program product embodied in a computer readable medium for operating in a system comprising a processing unit, a memory, a bus, and input/output (I/O) interfaces, for implementing a method for managing server performance degradation in a virtual universe (VU) having one or more regions, the VU having at least one VU server assigned to serve the one or more regions, at least one of the regions having one or more residents therein, the method comprising: determining server load on a VU server; determining whether the server load has exceeded a prespecified server load threshold; if the server load has exceeded the prespecified server load threshold, reducing the server load; determining if a server failure is imminent; and, if a server failure is imminent, providing a notification to the residents of the one or more regions.

In yet another embodiment, a method for deploying computing infrastructure, comprising integrating computer-readable code into a computing system, wherein the code in combination with the computing system is capable of performing a process of managing server performance degradation in a virtual universe (VU) having one or more regions, the VU having at least one VU server assigned to serve the one or more regions, at least one of the regions having one or more residents therein, the method comprising: the process comprising: determining server load on a VU server; determining whether the server load has exceeded a prespecified server load threshold; if the server load has exceeded the prespecified server load threshold, reducing the server load; determining if a server failure is imminent; and, if a server failure is imminent, providing a notification to the residents of the one or more regions.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention.

DETAILED DESCRIPTION OF THE INVENTION

Aspects of the present invention provide a solution for managing server performance degradation in a virtual world environment.

Figure 1:
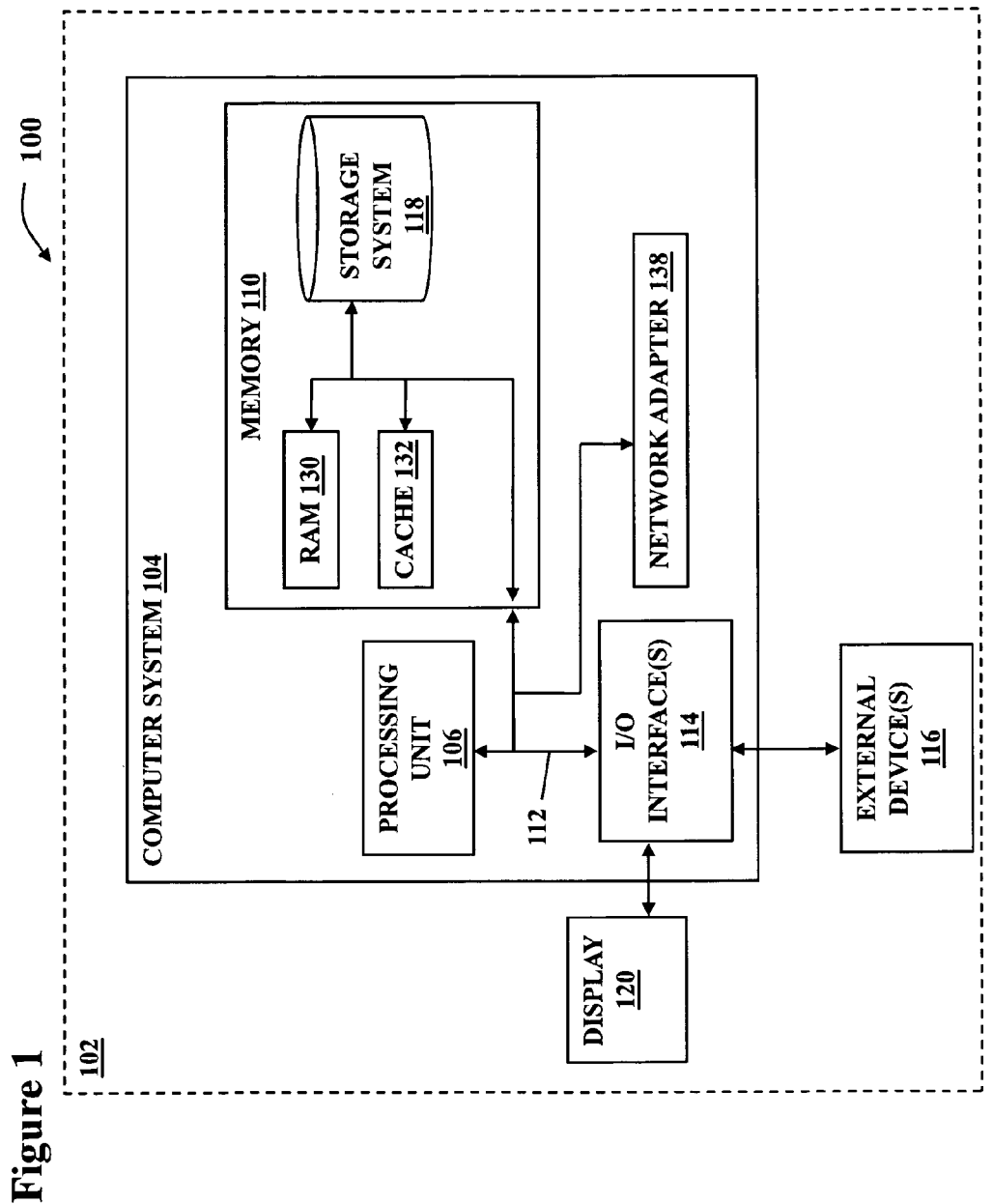
FIG. 1 shows a data processing system suitable for implementing an embodiment of the present invention.

A system, such as System 100, may have a data processing system, such as Data Processing System 102 shown in FIG. 1, suitable for storing and/or executing program code of the present invention, may include a computer system, such as Computer System 104, having at least one processing unit (Processing Unit 106) coupled directly or indirectly to memory elements (Memory 110) through a system bus, such as System Bus 112. Memory 110 may include local memory (RAM 130) employed during actual execution of the program code, bulk storage (Storage 118), and cache memories (Cache 132) that provide temporary storage of at least some program code in order to reduce the number of times code must be retrieved from Storage 118 during execution. Input/output or I/O devices (such as Display 120, and other external devices (External Devices 116), including but not limited to keyboards, pointing devices, etc.)) may be coupled to Computer System 104 either directly or through intervening I/O controllers (I/O Interface(s) 114). Network adapter(s) (Network Adapter 138) may provide access to external networks.

Figure 2:
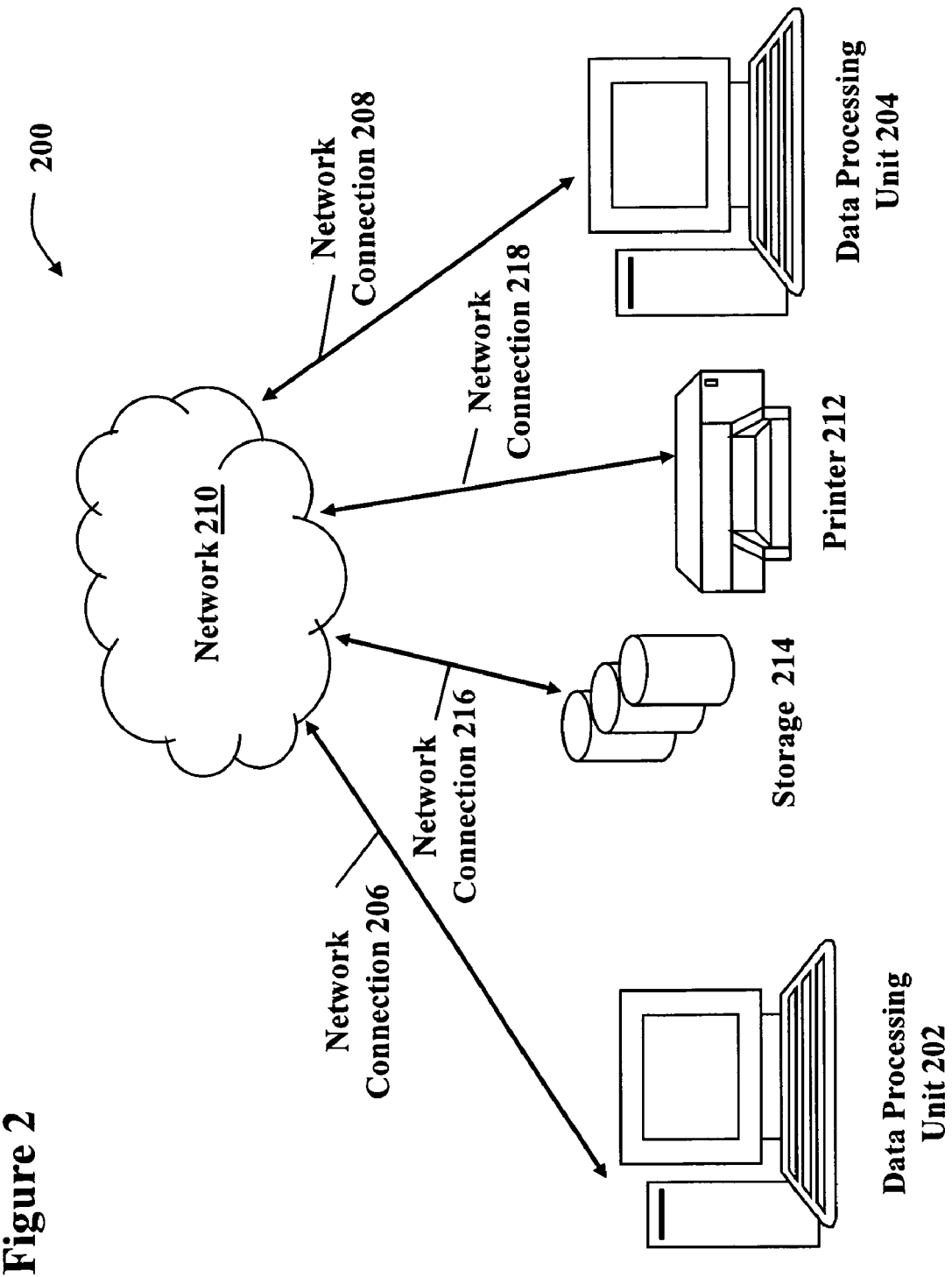
FIG. 2 shows a network for implementing an embodiment of the present invention.

FIG. 2 illustrates a networked system, such as System 200 to enable a data processing system (Data Processing Unit 202) to be coupled through network connection(s) (Network Connection 206, 208, 216, 218) to other data processing systems (Data Processing Unit 204), remote printers (Printer 212) and/or storage devices (Storage 214) through intervening private and/or public network(s) (Network 210). (A computer network is composed of multiple computers connected together using a telecommunication system for the purpose of sharing data, resources and communication. Modems, cable modem and Ethernet cards are just a few of the currently available types of network adapters. (A network card, network adapter or NIC (network interface card) is a piece of computer hardware designed to allow computers to communicate over a computer network. It is both an OSI layer 1 (physical layer) and layer 2 (data link layer) device, as it provides physical access to a networking medium and provides a low-level addressing system through the use of MAC addresses. It allows users to connect to each other either by using cables or wirelessly.)

Figure 3:
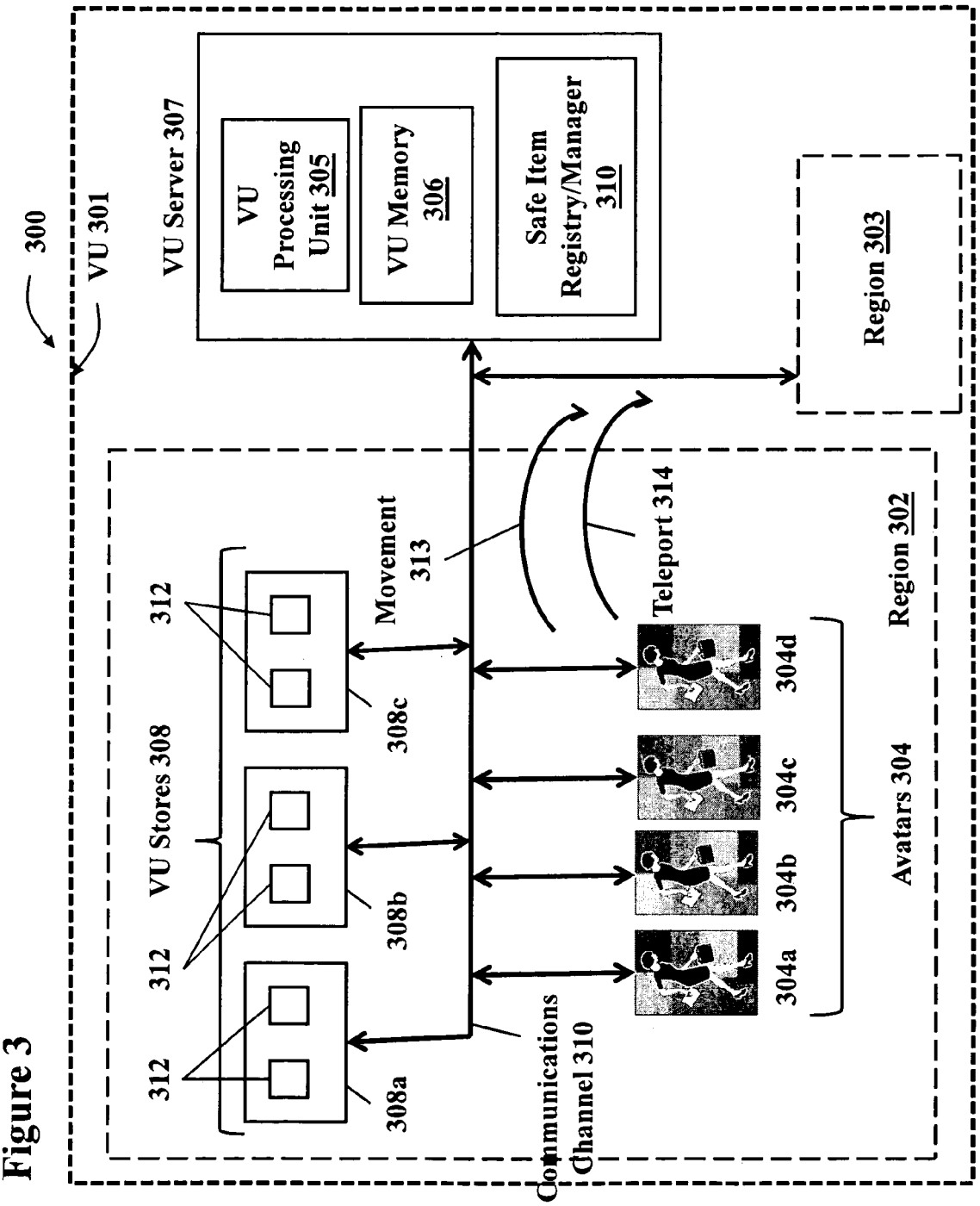
FIG. 3 illustrates an embodiment of the system of the present invention in a virtual universe.

A system 300 for implementing the present invention is shown in FIG. 3 having a virtual universe (VU 301) that may have a VU server, such as VU Server 307. VU Server 307 may be assigned one or more regions of land within VU 301, such as Region 302 and Region 303. VU Server 307 may be assigned other regions as well.

VU Server 307 may include: a VU processing unit, such as VU Processing Unit 305, for providing processing function; a VU memory, such as VU Memory 306, for storing information about VU 301 and activities and avatars within Region 302 and Region 303; and one or more avatars, such as Avatars 304 (304a, 304b, 304c, 304d). There may be any number of Avatars 304. Avatars 304 may be able to communicate with one another, with VU stores, such as VU Stores 308, with VU processing unit 305 or with VU memory 306 or with other assets (such as avatar attachments, vehicles, buildings, furniture, sculpture or other items) in VU 301 via a communications channel, such as Communications Channel 310. Avatars 304 may be considered to be VU residents. Alternatively, a "resident" may be considered the human owner of the avatar.

Residents may be represented in the environment by an avatar. The basic avatar is humanoid in shape that may be customized in a variety of ways:
- a series of GUI controls, modifying every aspect of the basic mesh (body shape, skin, hair style etc.);
- creating clothing or buying clothes made by other residents;
- attachments—3D objects intended to supplement or replace body structure, clothes or hair;
- animation overriders (intended to supplement or replace the stock set of animations) using, for instance, a scripting language to trigger animations stored in an animation file format; and/or
- sonic overriders—using a scripting language to trigger sounds such as footsteps, or emotive cues such as laughing and crying.

Any of these could be considered to be a virtual good, object or item.

The result can either be faithful to an original humanoid avatar, or can result in a completely non-humanoid representation of a character. These customizations can be packaged up into a single outfit with common applications of outfits.

VU Stores 308 (308a, 308b, 308c) may have Items 312 for sale to Avatars 304. Items or Objects 312 may be real or virtual. A real item or object may be a car or a motorcycle, for example. A virtual item or object may be anything from clothing for the avatar to a dental chart. The system allows an avatar to purchase a real or a virtual item or good.

Region 302 and Region 303 may be a virtual area of land within VU 301 assigned to VU Server 307. Avatars 304 may move between Regions 302, 303 as indicated by Movement arrow 313 or may teleport between Regions 302, 303 as indicated by Teleport arrow 314.

As shown in FIG. 3, VU Server 307 is assigned Region 302 and Region 303. For these assigned regions, VU Server 307 may be assigned to perform calculations for activities within these assigned regions. Activities include, but are not limited to, identifying and describing the then current geometry of the visible region for each resident or avatar, transmitting required textures for region rendering, streaming media such as music or video and transitioning residents or avatars to/from other VU servers as residents move between regions. The number of residents can quickly shift to one region of land and one corresponding server from another region of land and another corresponding server. If the server does not have enough computing resources available for the number of residents on the land, users of the VU may notice service degradation or, alternatively, a server failure may occur.

Figure 4:
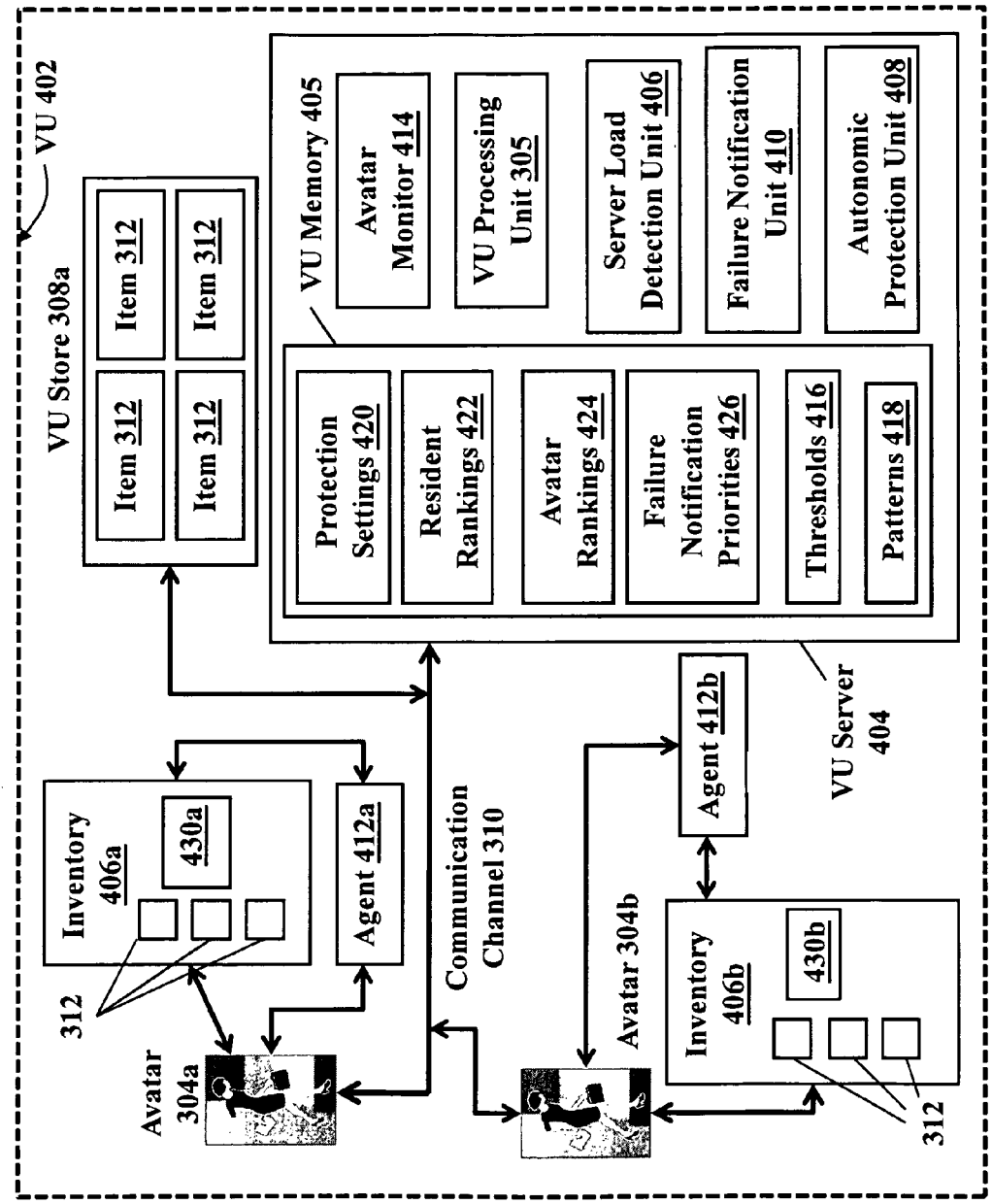
FIG. 4 illustrates a system for managing server performance degradation in a virtual universe.

FIG. 4 illustrates a system, such as System 400, that may have a virtual universe, such as Virtual Universe 402. As noted with respect to FIG. 3, Virtual Universe 402 may have one or more avatars such as Avatars 304a, 304b, one or more VU stores such as VU Store 308a (only one VU store shown in the interest of clarity) having Items 312, and a VU server, such as VU Server 404, interconnected by Communication Channel 310. VU Server 404 may have a memory, such as VU Memory 405, a processing unit, such as VU Processing Unit 305, a detection unit, such as Server Load Detection Unit 406, for determining, monitoring and identifying server load and for determining whether the server load passes a prespecified threshold, a unit, such as Autonomic Protection Unit 408, for autonomically reducing the server load on VU Server 404 if the server load has passed a prespecified threshold (such as Thresholds 416 in VU Memory 405) as indicated by Server Load Detection Unit 406, and a unit, such as Failure Notification Unit 410, for notifying a potential server failure to residents of the regions served by VU Server 404. "Server load" for the purposes herein may be considered to be a measure of the amount of work that the server is doing. VU Server 404 may further have Avatar Monitor 414 that may monitor avatar/resident movement between, toward and away from regions. Memory 405 may have settings for how the VU administrator or owner wants VU Server 404 protected, such as Protection Settings 420, patterns (Patterns 418) that may indicate potential VU server failure, such as a sharp spike in VU server load, the rankings of residents (such as Resident Rankings 422) to determine the order in which the residents should be removed if the VU server is becoming overloaded, rankings of avatars (such as Avatar Rankings 424) to determine the order in which the avatars should be removed if the VU server is becoming overloaded, and settings (such as Failure Notification Priorities 426) regarding priority to determine which users are first notified of imminent VU server failure. VU Memory 405 may further have Thresholds 416 which comprises server load thresholds that Server Load Detection Unit 406 may use to determine potential server load failure.

Each avatar (Avatar 304a, 304b) may have an item inventory associated with the avatar, such as Item Inventory 406a (associated with Avatar 304a) and Item Inventory 406b (associated with Avatar 304b) for storing Inventory Items 312. Item Inventory 406a, Item Inventory 406b each may have an inventory manager, such as Inventory Manager 430a, 430b, respectively, for managing the respective item inventories. Avatars 304a, 304b may purchase Items 312 from VU Store 308a, exchange the items with one another, take an item into another region as discussed in relation to FIG. 3, or pick up or drop off an item. As previously discussed, the items may be clothing or other goods as represented by Items 312.

Assets, avatars, the environment, and anything visual may have unique identifiers (UUIDs) tied to geometric data (distributed to users as textual coordinates), textures (distributed to users as graphics files), effects data (rendered by the user's client according to the user's preferences and user's device capabilities), and object data (distributed to users and/or the VU Processing Unit 305 as information describing the object and other metadata).

Each user (such as represented by Avatars 304a, 304b) has an agent, such as Agent 412a, 412b as shown in FIG. 4. An agent is a user's account, through which the user can build an avatar, for example, and that is associated with the inventory of assets that the user owns.

VU server load is influenced by a multitude of factors existing within the VU server's assigned region or regions, such as Region 302, Region 303, including but not limited to the number of residents located within the assigned region or regions of the VU server, such as VU Server 404, the number and complexity of distinct textures within the assigned region (s), and streaming media such as music or video entering/leaving the assigned region(s). As more residents enter a region, VU Server 404 may need to expend additional processing unit (such as VU Processing Unit 305) cycles and memory (such as VU Memory 405) thereby creating additional server load. For each resident, VU Processing Unit 305 resources are required to transmit geometric information ("geometries") and avatar movements, to transmit textures to users (or users' clients, such as users' respective computer systems), and stream audio and video for the region assigned to VU Server 404. If the VU Processing Unit's 305 resources required for all residents exceeds the available VU Processing Unit 305 resources on VU Server 404, performance for users served by VU Server 404 degrades.

Server Load Detection Unit 406 may detect, determine and monitor server load on VU Server 404. Server load detection may be performed in numerous ways including but not limited to monitoring hardware resources such as VU Processing Unit 305 and VU Memory 405, the time used for and the amount of swapping within VU Memory 405, such as between cache, RAM, and long term memory, for example, and the time taken for and amount of disk input and output. Further, additional specialized kernel monitoring software can also be used to measure the kernel activity. (A kernel is the central component of most computer operating systems (OS). Its responsibilities include managing the system's resources (the communication between hardware and software components).) Protection Settings 420, Resident Rankings 422, Avatar Rankings 424, Failure Notification Priorities 426, Thresholds 416, and Patterns 418 provide instructions to the monitoring operation or are otherwise used by the monitoring operation.

Service degradation may also be detected by determining the "wall time" for certain VU server operations to complete and comparing the elapsed wall time for those operations to previously measured baselines. ("Wall time" is a measure of how much real time that elapses from start to end, including time that passes due to programmed (artificial) delays or waiting for resources to become available.) If performance degrades below a threshold for a time period, an overload detection system (Server Load Detection Unit 406) engages an autonomic protection system (Autonomic Protection Unit 408) described below. After engagement, Server Load Detection Unit 406 continues to monitor degradation and, if Autonomic Protection Unit 408 cannot reduce degradation to an acceptable level, a failure notification system (Failure Notification Unit 410) is engaged to notify users of VU Server 404.

It should be noted that most regions have a distinct resident threshold that results in degraded performance. These distinct resident thresholds per region are stored in Thresholds 416. Each threshold is influenced by textures, geometric information (geometries) and streaming media uses within each of the server's assigned regions. Of additional interest is that using "wall time" to detect degraded performance has the benefit of detecting server performance degradation due to processes running external to the execution of VU server processes, but on the same server machine. Such processes include indexing the file system, managing user terminals, managing file transfers, etc.

Additionally, it should be noted that Server Load Detection Unit 406 may store and analyze performance metrics before, during and after the degradation occurs in VU Memory 405. Server Load Detection Unit 406 may be able to preemptively engage Autonomic Protection Unit 408 upon detection that VU Server 404 is on the verge of degradation and, in conjunction with Avatar Monitor 414, that additional residents are en route to a region assigned to VU Server 404 (through a teleportation notification, for example). For instance, multiple thresholds (Thresholds 416) may be set so that so that the verge of degradation of VU Server 404 may be detected by Server Load Detection Unit 406 and Server Load Detection Unit 406 may be able to preemptively engage Autonomic Protection Unit 408. Further, Server Load Detection Unit 406 may be able to preemptively engage Autonomic Protection Unit 408 by continuously monitoring the server load for determining sharp increases, steady increases, analyzing against historical data and the like, projecting future load for preemptive engagement of Autonomic Protection Unit 408. Server Load Detection Unit 406 may utilize Patterns 418 (for indicating sharp or steady load increases) and Thresholds 416 for this purpose.

If Server Load Detection Unit 406 and Avatar Monitor 414 determine that more residents are going to enter into a region in jeopardy, Server Load Detection Unit 406 may preemptively engage Autonomic Protection Unit 408 so that Autonomic Protection Unit 408 may take protective action such as denying entry to the arriving residents.

Autonomic Protection Unit 408 may take steps to heal VU Server 404 to prevent server failure in overloaded conditions. Autonomic Protection Unit 408 may reduce server resource consumption by lowering the quality of the immersive environment and suspend certain processing unit intensive features.

To reduce processing unit usage, Autonomic Protection Unit 408 may reduce the level of details in the geometries VU Server 404 transmits to a VU client. For example, if a barn were located within Region 302, under normal and acceptable server load conditions, to geometrically describe the barn may require, as an example, transmission of 1000 unique geometric points by VU Server 404 to a client. If Server Load Detection Unit 406 determines that the server load has exceeded a prespecified server load threshold, Autonomic Protection Unit 408 may reduce the accuracy and sharpness of the barn by reducing the number of points it allows VU Server 404 to transmit to the client. In such a scenario, the outer most points of such a shape may be transmitted but inner points would be elided from transmission. This reduces the required processing unit cycles for this operation and thus reduces the server load on VU Server 404. Further, because a calculation of outer most points in a three-dimensional (3D) space in and of itself may consume processing unit cycles, this calculation may be performed and stored ahead of time, such as during object creation, thereby reducing on-the-fly processing unit usage Textures are graphical objects that, along with geometric data, describe a shape within a virtual universe. Textures vary in dimensions, colors, metadata, and complexity. All four factors influence the amount of memory required to store the texture which, in turn, influences the amount of processing unit resources required to transmit the texture to the client. Most VU clients cache textures to prevent overwhelming the VU server with texture requests. However, if residents are new to the area, the respective client may lack, in its cache, a certain texture required to render land in a region assigned to a particular VU server. If Server Load Detection Unit 406 and Autonomic Protection Unit 408 have been engaged and the server load has been determined to be over the load threshold, VU Server 404 may deny a request for a texture, send a pre-created lower resolution texture, or send color data to fill geometries. The VU client may attempt to interpolate the texture based on surrounding textures, display a warning that not all textures are available, or use a generic texture available on the client.

If VU Server 404 is streaming media data, Autonomic Protection Unit 408 may degrade the quality of the media or may stop streaming the media entirely. Alternatively, if the source of the media contains the media stream in multiple bit rates, the server may opt to only stream the lowest and least processing unit intensive media stream. Additionally, if the media stream contains both visual and audio data, Autonomic Protection Unit 408 may omit either the visual or audio stream, depending upon its configuration. Autonomic Protection Unit 408 configuration settings may be initially set by a server administrator and stored in VU Memory 306. For further resource savings, Autonomic Protection Unit 408 may stop streaming some of the media sources, again depending upon its configuration. In order to determine the order in which each media data stream is disabled, VU Server 404 may incorporate a ranking system. Some example inputs into the ranking: highest bit rate, number of avatar viewers, owner of streams monetary contribution to the organization who owns the server, etc.

If Server Load Detection Unit 406 determines that server performance has been degraded to an unacceptable level, Autonomic Protection Unit 408 may not allow new residents into regions of land served by VU Server 404, such as Region 302, 303. VU clients, upon attempt to enter Region 302, 303, may be notified by VU Server 404 that the region of land is presently unavailable. Still yet, Autonomic Protection Unit 408 may remove residents presently in regions of land served by VU Server 404, such as Region 302, 303 to reduce VU Processing Unit 305 resources consumed. Removal of residents could be random, by order of entrance into land (First In, First Out/Last In, First Out, etc.), by the level of activity of each avatar (i.e., idle avatars may be removed first), or through a ranking system.

A ranking system may be employed by VU stores, such as VU Store 308, to keep customers most likely to purchase and remove customers whose activity within VU Store 308 indicates that a particular customer is unlikely to conduct a transaction with the store. Additionally, for finer rankings, it may be determined which residents are likely to result in the greatest profit to, for example, VU Stores 308 by staying within the region served by the VU server.

In another embodiment, VU Server 404 may allow residents to purchase a higher priority to avoid being removed from regions of land. In another embodiment the owner of the region may maintain a list of high priority avatars. Yet still, in another embodiment, users may vote on avatar priority in a region of land.

Figure 5:
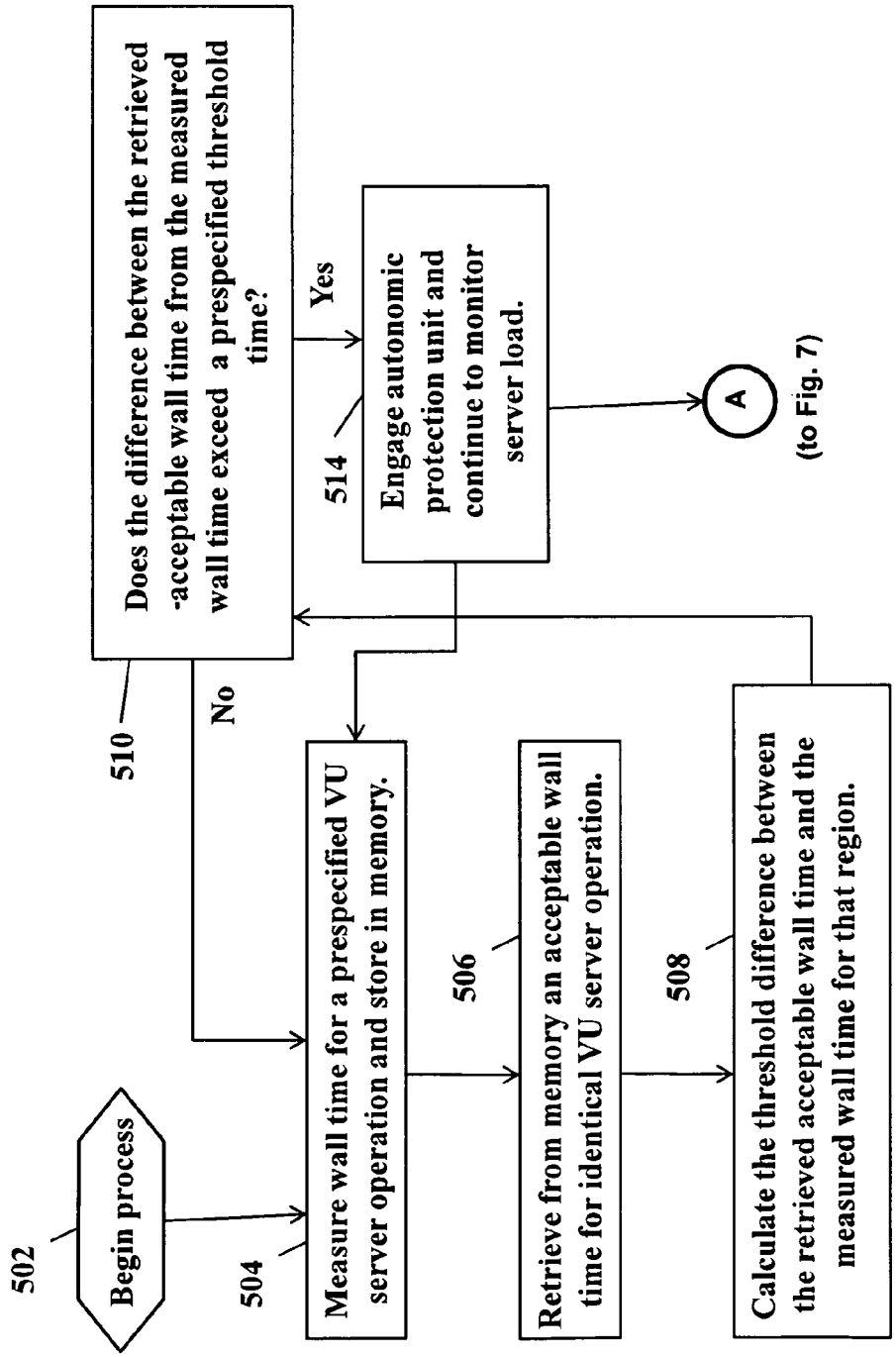
FIG. 5 illustrates a method for measuring server performance degradation.

FIG. 5 illustrates an embodiment of a process 500 of the present invention for determining server load that begins at 502. At 504, Server Load Detection Unit 406 measures the wall time for a prespecified VU server operation and stores the measurement in Memory 405. At 506, Server Load Detection Unit 406 retrieves from Memory 405 an acceptable wall time for an identical VU server operation for that region. At 508, Server Load Detection Unit 406 calculates the threshold difference between the retrieved wall time and the measured wall time. At 510, Server Load Detection Unit 406 determines if the difference between the retrieved acceptable wall time from the measured wall time exceeds a prespecified threshold time and, if not, Server Load Detection Unit 406 continues to monitor server load at 504. If so, Server Load Detection Unit 406 engages Autonomic Protection Unit 408 and continues to monitor server load at 514. In addition, the process moves to A as shown in Process 700 and described with FIG. 7.

Figure 6:
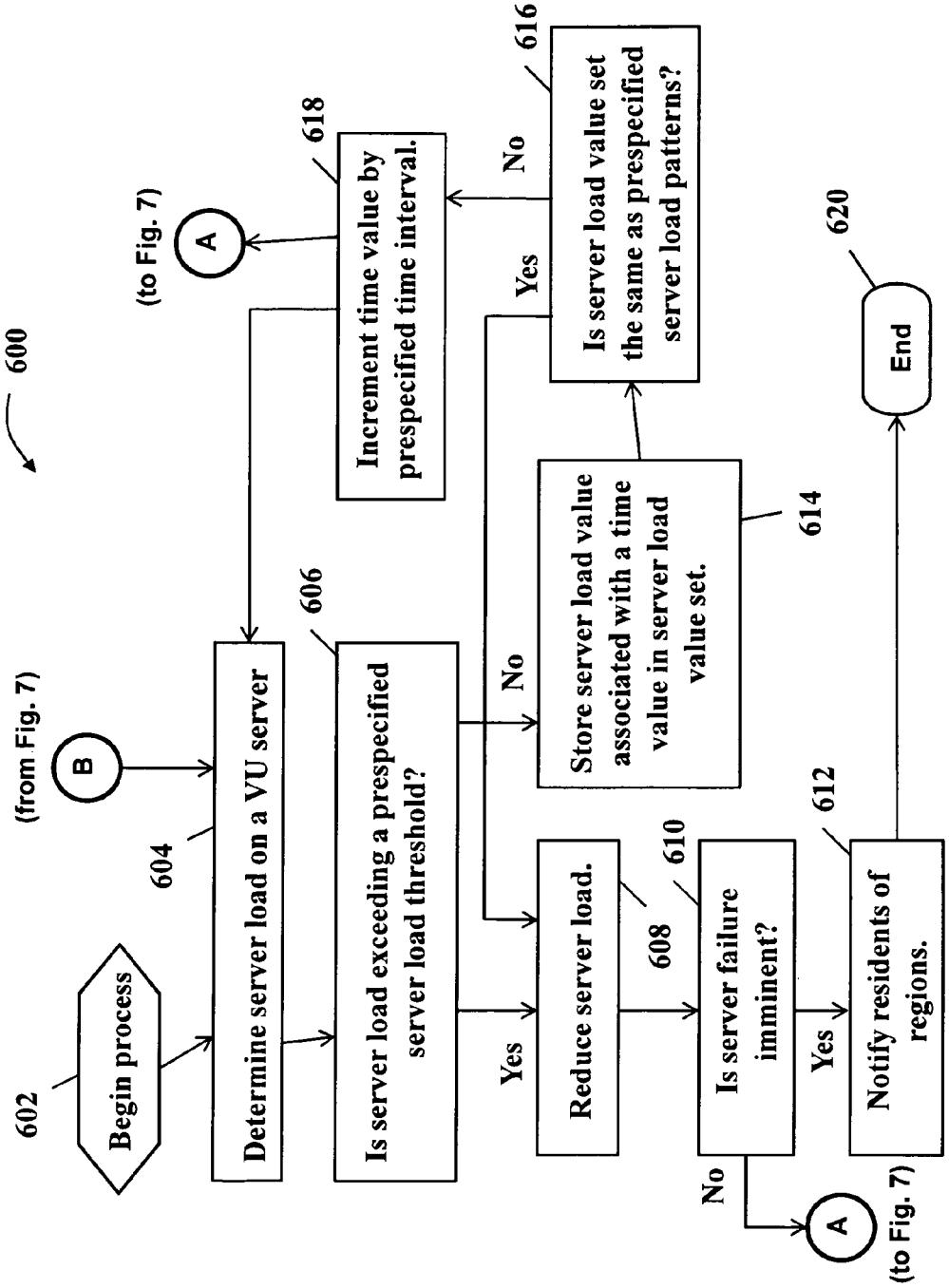
FIG. 6 is an illustrative embodiment of the method of the present invention for measuring server performance.

Process 700 continues from A to 704 where Avatar Monitor 414 determines whether any avatars have requested entrance into regions and, if not, the process continues at B as shown in process 600 and described with FIG. 6. If Avatar Monitor 414 determines that avatars have requested entrance into regions at 704, at 706, Autonomic Protection Unit 408 examines Protection Settings 420. At 708, Autonomic Protection Unit 408 determines whether the protection settings have been set to deny entrance into region in jeopardy and, if so, at 712, Autonomic Protection Unit 408 denies entrance to those requesting avatars and continues to 710 where Autonomic Protection Unit 408 reduces server load and continues to B as shown in process 600 and described with FIG. 6. If the protection settings have not been set to deny entrance into region in jeopardy, the process continues from 708 to B as shown in process 600 and described with FIG. 6.

Figure 7:
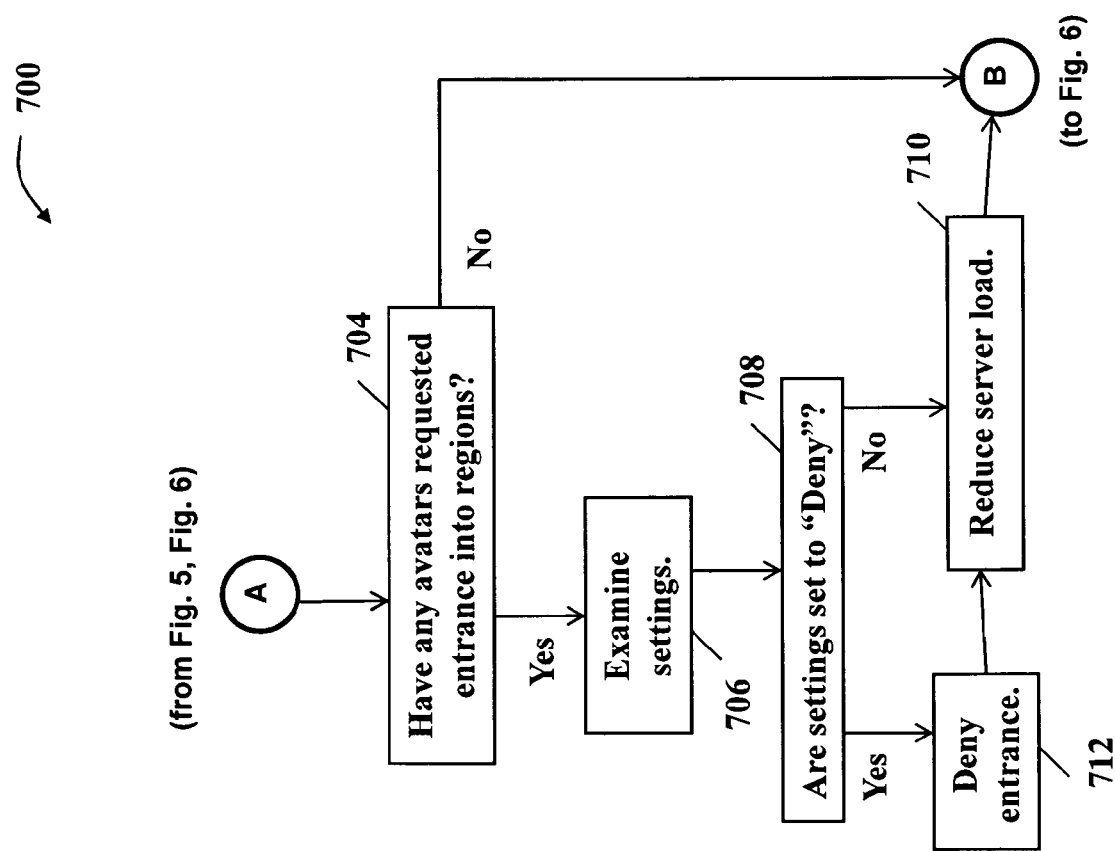
FIG. 7 is an illustrative embodiment of a method of the present invention for reducing server load.

FIG. 6 illustrates Process 600 that begins at 602 and continues to 604 where B from FIG. 7 continues as well. At 604, Server Load Detection Unit 406 determines the server load on VU Server 404 and, at 606, determines whether server load is exceeding a prespecified server load threshold. If so, at 608, Autonomic Protection Unit 408 reduces server load and, at 610, determines whether server failure is imminent. If not, the process moves to A as shown in and discussed in connection with FIG. 7. If so, at 612, the Failure Notification Unit 410 is engaged and the residents of the regions served by the failing server are notified and the process ends at 620.

If, at 606, Server Load Detection Unit 406 determines that server load is not exceeding a prespecified server load threshold, at 614, the server load value associated with a time value is stored in a server load value set. At 616, Server Load Detection Unit 406 determines whether server load value set is the same as prespecified server load patterns stored in Patterns 418 in VU Memory 405. If so, the server load is reduced by Autonomic Protection Unit 408 at 608 and the process continues as discussed. If, at 616, Server Load Detection Unit 406 determines that server load value set is not the same as prespecified server load patterns stored in Patterns 418 in VU Memory 405, the time value is incremented by a prespecified time interval at 618 and the process continues to 604 as discussed above. Contemporaneously, the process moves to A as shown in and discussed in connection with FIG. 7.

Figure 8:
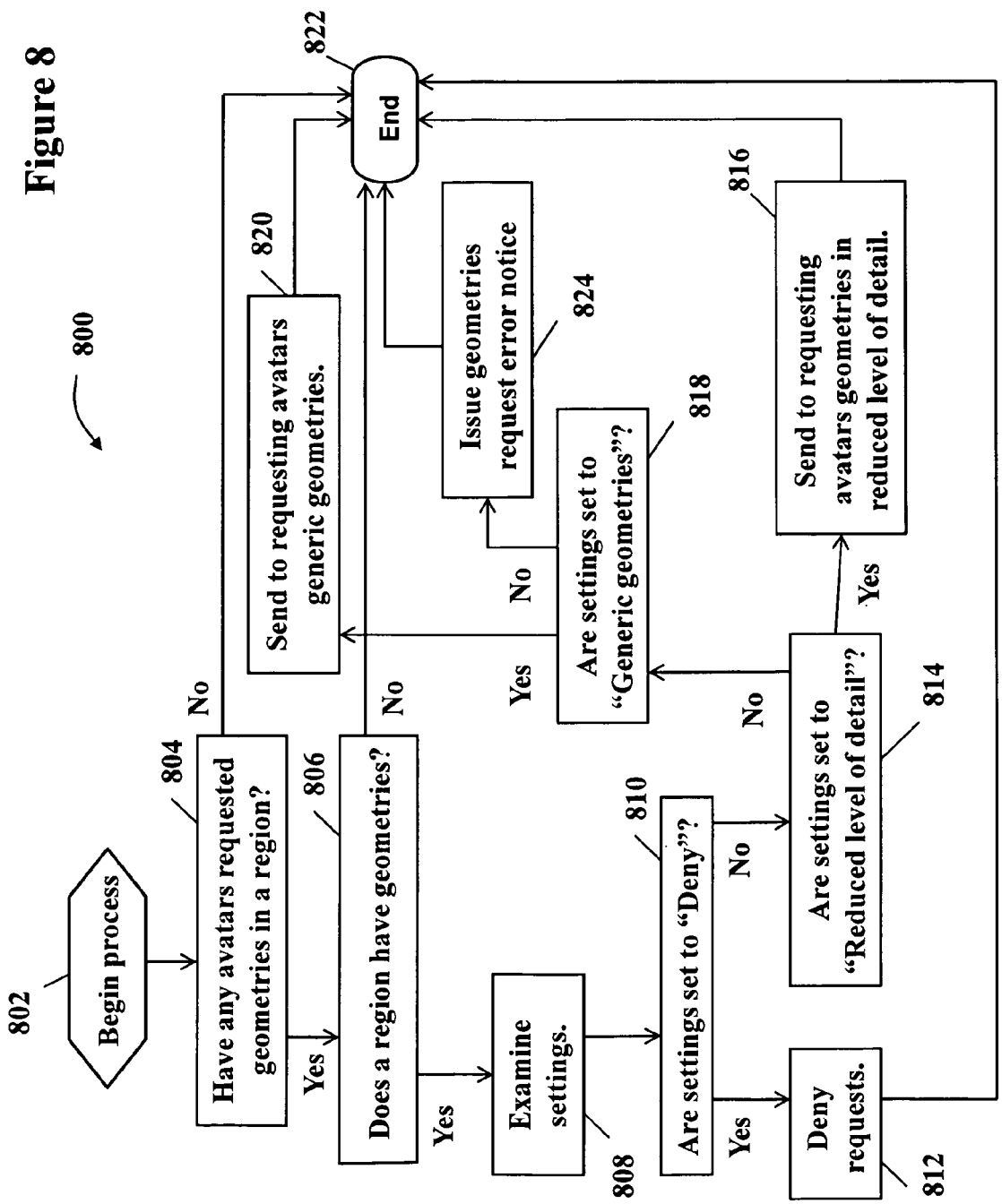
FIG. 8 is an illustrative embodiment of a method of the present invention for reducing server load.

FIG. 8 illustrates an embodiment of a method of the present invention for reducing server load at VU Server 404. Method 800 begins at 802 and, at 804, it is determined whether any avatars have requested geometries in a region served by the VU server that is overloaded. If not, the process ends at 822. If so, it is determined at 806 whether the region has geometries. If not, the process ends at 822. If so, Protection Settings 420 are examined at 808 and, if the settings indicate that requests for the geometries should be denied at 810, the requests at 812 are denied and the process ends at 822. If, at 810, the settings do not indicate that requests for the geometries should be denied, it is determined whether settings are set to "Reduced level of detail" for geometries at 814. If so, at 816, geometries in reduced level of detail are sent to the requesting avatars and the process ends at 822. If it is determined that settings are not set to "Reduced level of detail" for geometries at 814, it is determined whether settings are set to sending "generic geometries" at 818. If so, generic geometries are sent the requesting avatars at 820 and the process ends at 822. If not, at 824, a geometries request error notice is issued at 824 and the process ends 822.

Figure 9:
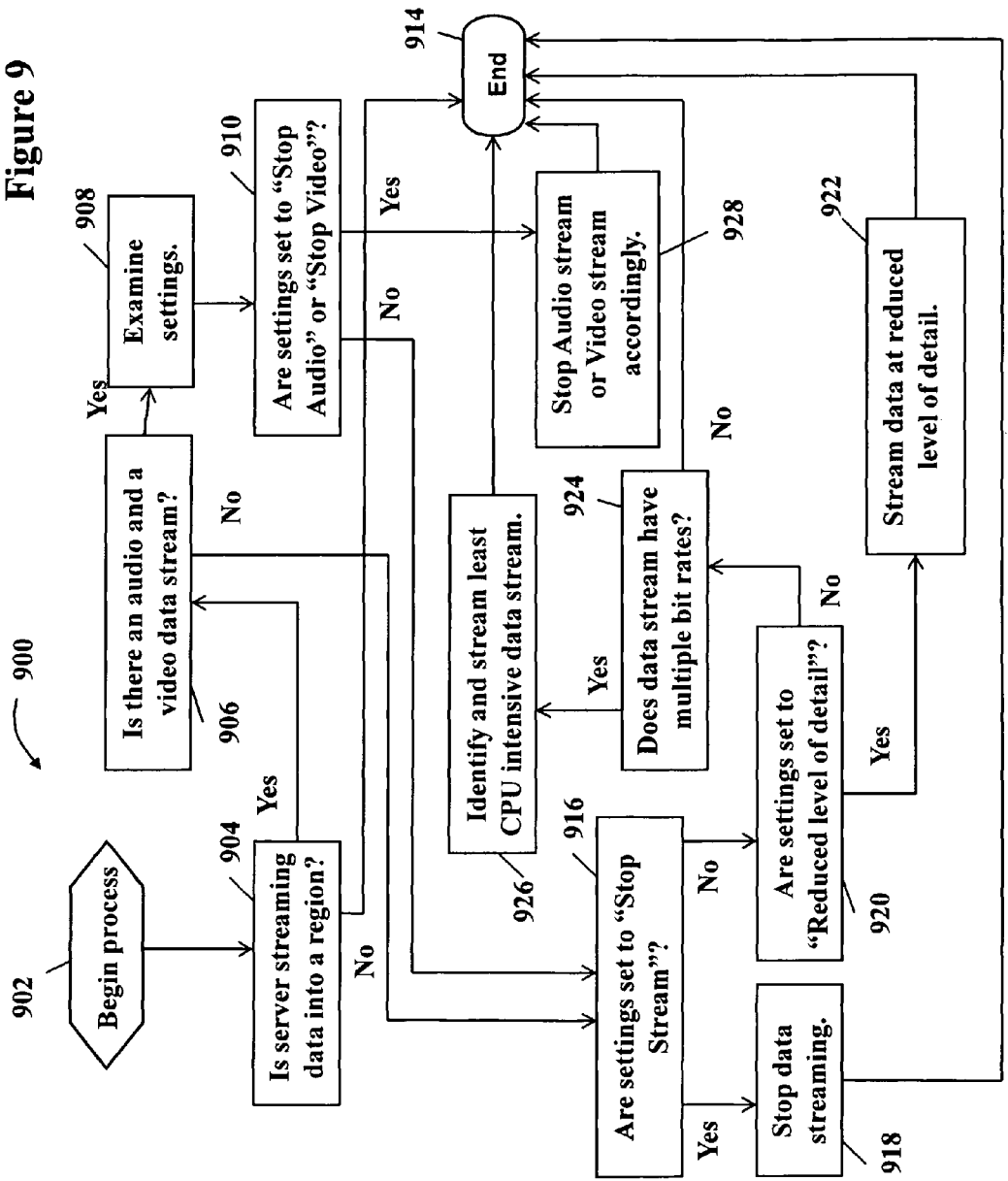
FIG. 9 is an illustrative embodiment of a method of the present invention for examining server settings.

FIG. 9 illustrates another embodiment of a method of the present invention for reducing server load at VU Server 404. Method 900 begins at 902 and, at 904, it is determined whether VU Server 404 is streaming data into a region served by VU Server 404 and, if not, the process ends at 914. If VU Server 404 is streaming data into a region served by VU Server 404, at 906, it is determined whether the data stream contains an audio and/or a video data stream. If so, at 908, Protection Settings 420 are examined and, at 910, it is determined if the settings are set to "Stop Video" or "Stop Audio". If so, at 928, the video and/or audio stream is stopped accordingly and the process ends at 914.

If, at 906, it is determined that the data stream does not contain an audio and/or a video data stream or, at 910, it is determined that the settings are not set to "Stop Video" or "Stop Audio", at 916, it is determined whether the settings are set to "Stop Stream" and, if so, at 918, data streaming is stopped and the process ends at 914. If, at 916, it is determined that the settings are not set to "Stop Stream", at 920, it is determined whether the settings are set to "Reduced level of detail". If so, at 922, data is streamed at reduced level of detail and the process ends at 914.

If, at 920, it is determined that the settings are not set to "Reduced level of detail", at 924, it is determined whether the data stream has multiple bit rates and, if not, the process ends at 914. If so, the data stream having the lowest bit rates are streamed at 926 while the streams with the highest bit rates are not streamed and the process ends at 914. [Bit rate of streamed media does not affect server CPU, it only affects the client CPU in the rendering. Instead, bit rate affects server network bandwidth.

Figure 10:
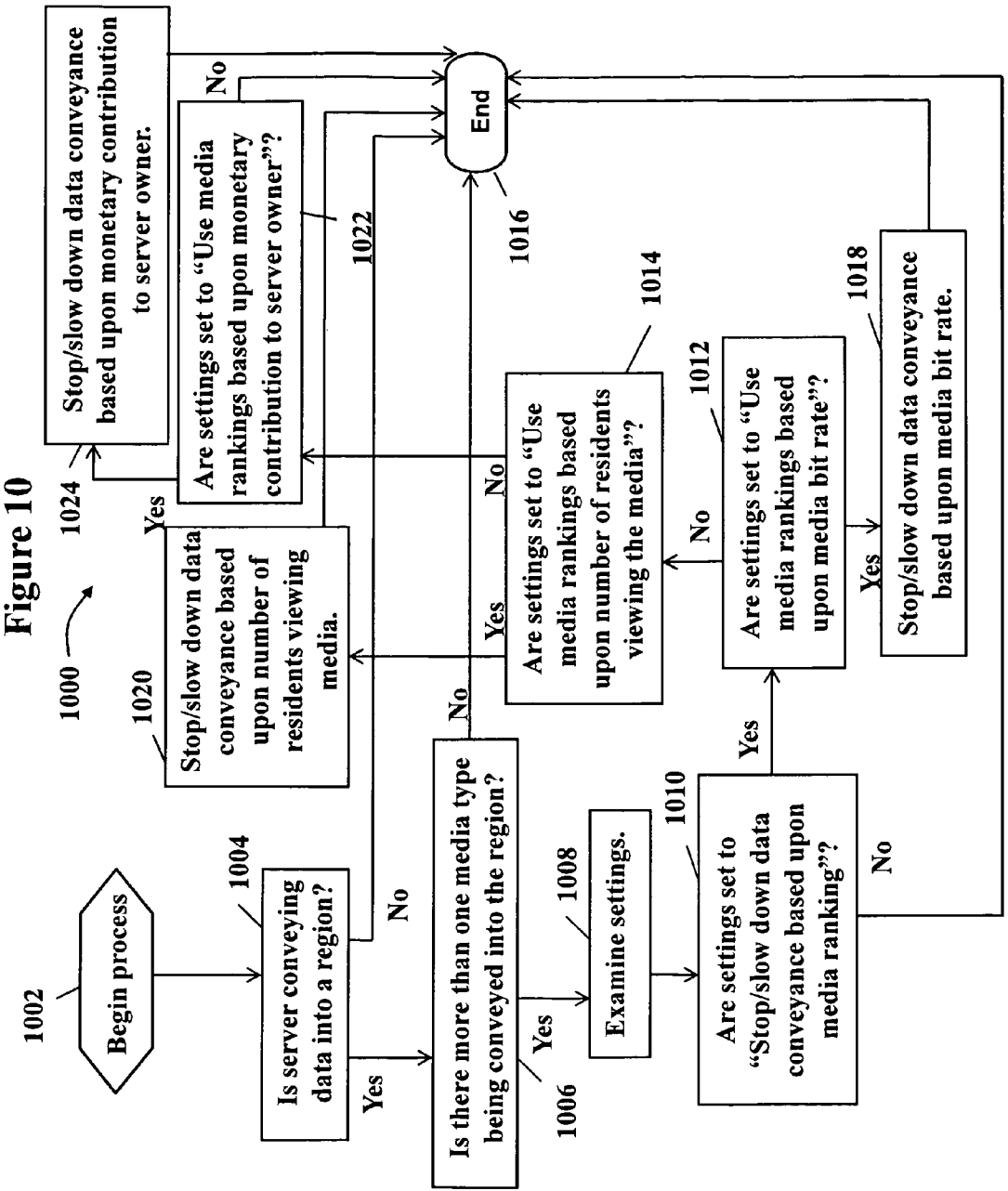
FIG. 10 is an illustrative embodiment of a method of the present invention for reducing server load.

FIG. 10 illustrates another embodiment of a method of the present invention for reducing server load at VU Server 404. Method 1000 begins at 1002 and, at 1004, it is determined whether VU Server 404 is conveying data into a region and, if not, the process ends at 1016. If so, at 1006, it is determined if there is more than one media type being conveyed into the region and, if not, the process ends at 1016. If so, the protection settings are examined at 1008 and, at 1010, it is determined if the settings are set to "Stop/slow down data conveyance based upon media ranking". If not, the process ends at 1016. If so, at 1012, it is determined if the settings are set to "Use media rankings based upon media bit rate" and, if so, data conveyance is stopped/slowed down based upon media bit rate and the process ends at 1016. If not, it is determined if the settings are set to "Use media rankings based upon number of residents viewing the media" at 1014 and, if not, it is determined if the settings are set to "Use media rankings based upon monetary contribution to server owner". If so, the data conveyance is stopped/slowed based upon monetary contribution to server owner. If, at 1014, the settings are set to "Use media rankings based upon number of residents viewing the media", at 1020, the data conveyance is stopped/slowed down based upon number of residents viewing media and the process ends at 1016.

Figure 11:
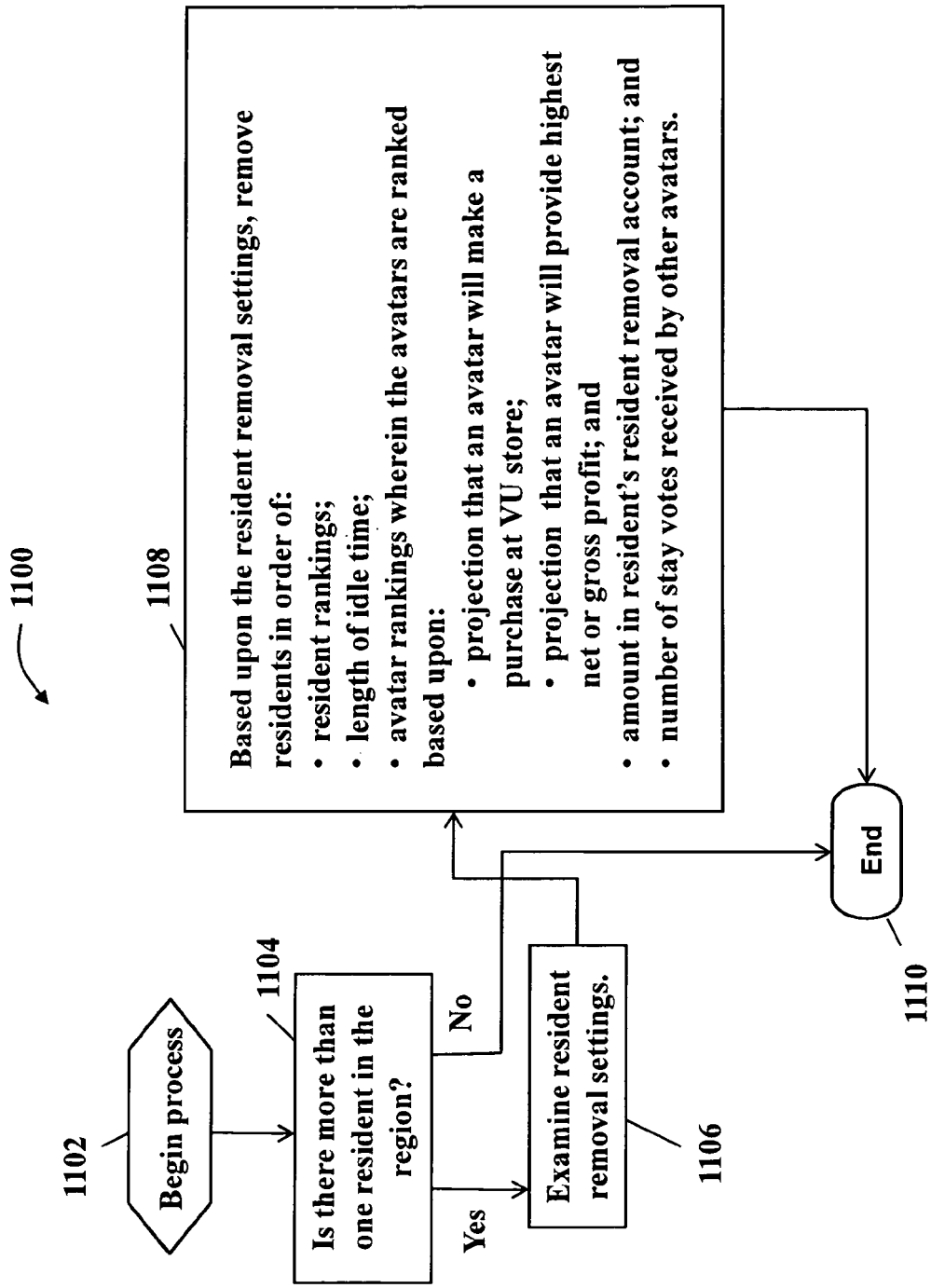
FIG. 11 is an illustrative embodiment of a method of the present invention for reducing server load.

FIG. 11 illustrates another embodiment of a method of the present invention for reducing server load at VU Server 404. Method 1100 begins at 1102 and, at 1104, it is determined whether there is more than one resident in a region served by VU Server 404 and, if not, the process ends at 1110. If so, at 1106, resident removal settings are examined and, at 1108, residents are removed in order of resident rankings; length of idle time; avatar rankings wherein the avatars are ranked based upon projection that an avatar will make a purchase at VU store, projection that an avatar will provide highest net or gross profit and amount in resident's resident removal account and number of stay votes received by other avatars. The process ends at 1110.

To preserve VU robustness in the face of impending overload, residents may tag items and parts of buildings and landscapes that may be removed during times of impending overload. This allows residents to input in the order in which items are removed during overloaded conditions. This information may be stored as metadata associated with each object.

Figure 12:
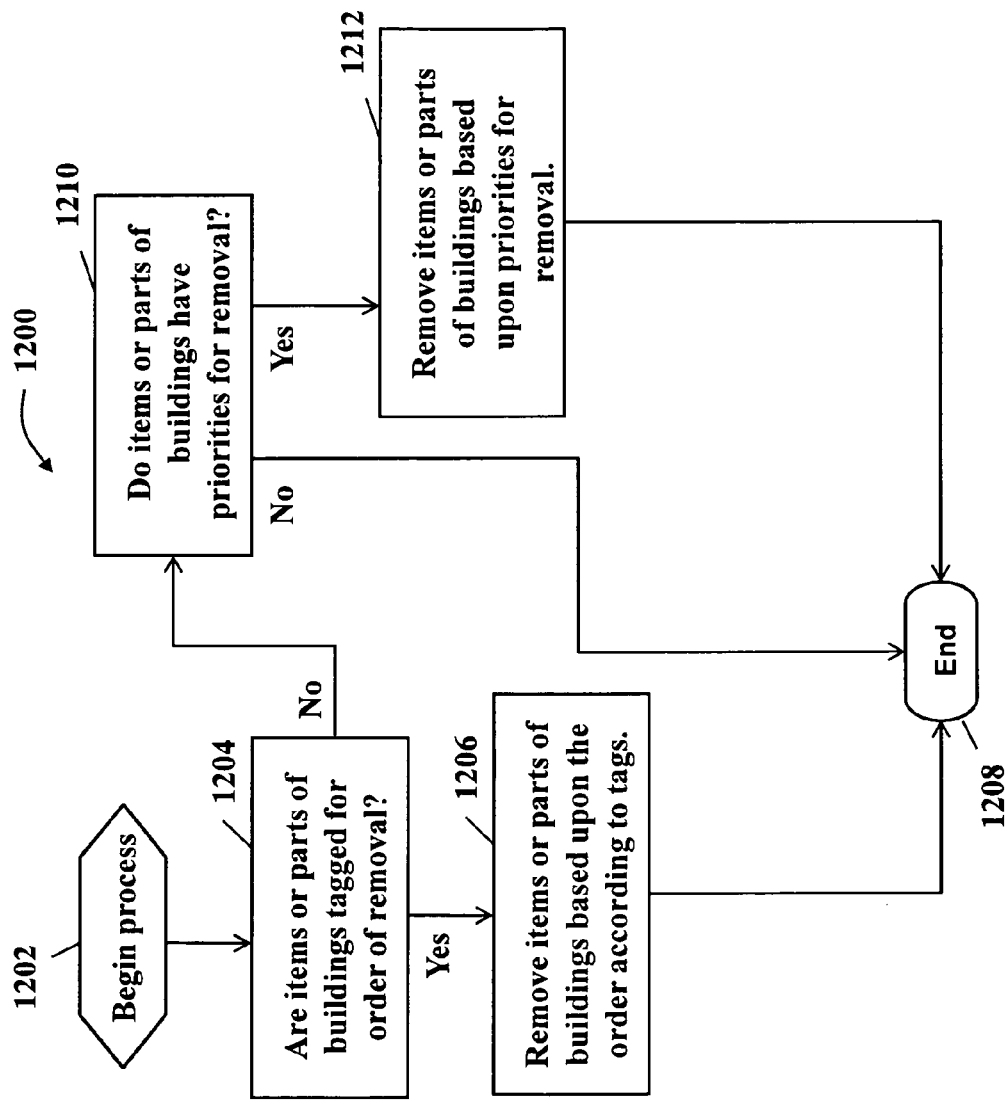
FIG. 12 is an illustrative embodiment of a method of the present invention for reducing server load.

FIG. 12 illustrates another embodiment of a method of the present invention for reducing server load at VU Server 404. Method 1200 begins at 1202 and, at 1204, it is determined if items or parts of buildings are tagged for order of removal. If so, at 1206, items or parts of buildings are removed based upon the order according to tags and, at 1208, the process ends. If not, it is determined if items or parts of buildings have priorities for order of removal at 1210 and, if so, at 1212, items or parts of buildings are removed based upon priorities for removal and the process ends at 1208.

If the autonomic server protection unit is unable to prevent an impending server failure, the server load detection unit notifies failure notification unit that a failure of the VU server is imminent. The failure notification unit contains methods to warn users of the VU server that near term failure is likely to occur. Such a warning can be delivered as text, audio or graphically to every client connected to the VU server. Some clients may automatically teleport away from the failing zone to either their previous location before connecting to this server or their VU home server. Alternatively, the VU server's operator may be informed of a server crash so action may be taken to either reduce the load on the server or restart the server if necessary.

Figure 13:
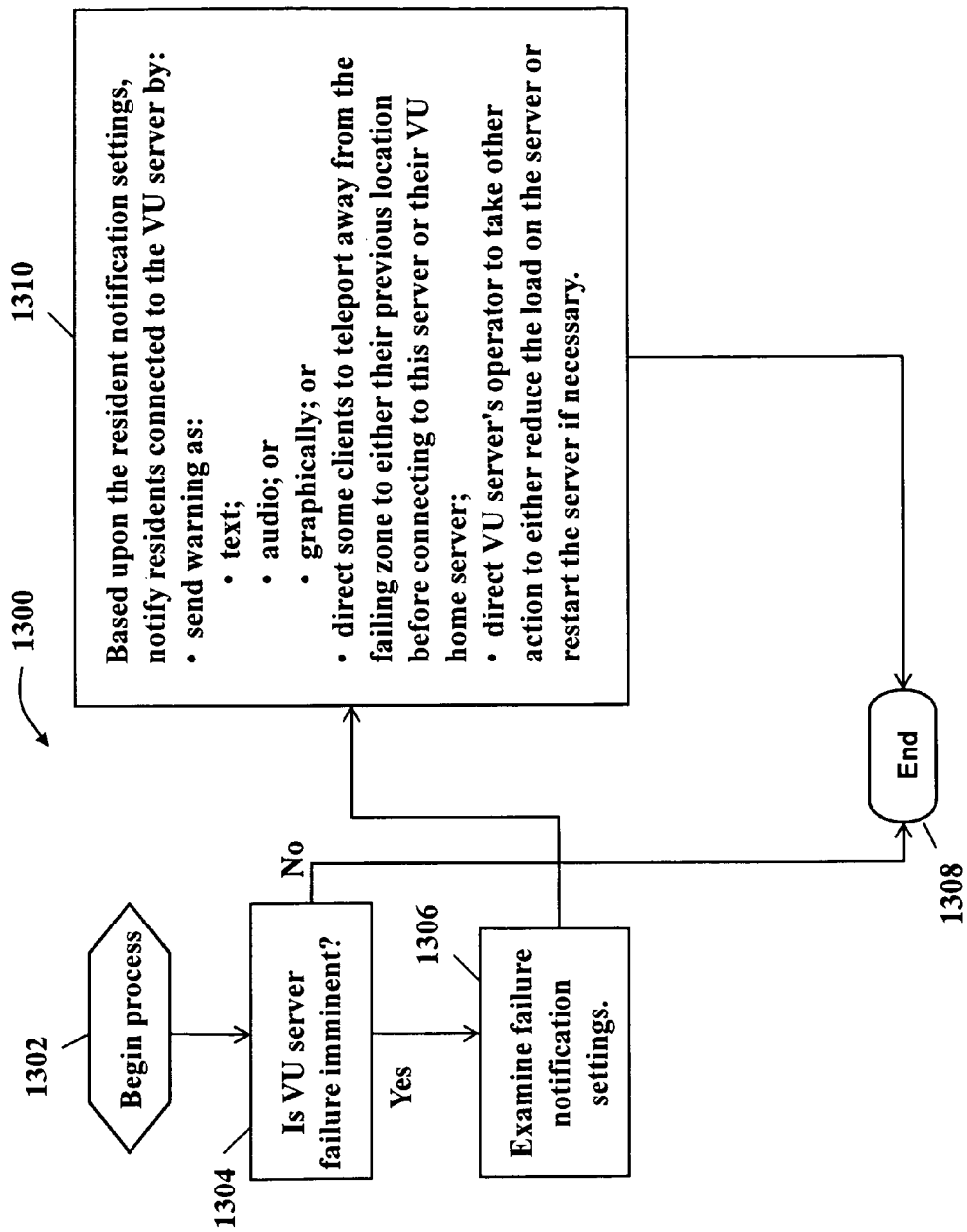
FIG. 13 is an illustrative embodiment of a method of the present invention for notifying residents of imminent server failure.

FIG. 13 illustrates an embodiment of a method of the present invention for notifying affected residents if the server load at VU Server 404 is causing imminent VU server failure. Method 1300 begins at 1302 and, at 1304, it is determined if VU Server 405 failure is imminent and, if not, the process ends at 1308. If so, at 1306, the failure notification settings are examined. At 1310, the VU Server 404, based upon the settings, indicate notification by sending text or audio, or graphically, or directing some clients to teleport away from the failing zone to either their previous location before connecting to this server or their VU home server, or directing VU server's operator to take other action to either reduce the load on the server or restart the server if necessary.

As the VU performance degrades, low and medium priority items may be eliminated from the region. Such priorities may be assigned by the owner, VU, or manufacturer. In some cases, priorities can be computed dynamically rules. For example, objects tagged "decoration" may be deemed non-essential.

It should be understood that the present invention is typically computer-implemented via hardware and/or software. As such, and client systems and/or servers will include computerized components as known in the art. Such components typically include, (among others), a processing unit, a memory, a bus, input/output (I/O) interfaces, external devices, etc.

While shown and described herein as a system and method for managing server performance degradation in a virtual world environment, it is understood that the invention further provides various alternative embodiments. For example, in one embodiment, the invention provides a computer-readable/useable medium that includes computer program code to provide a solution for managing server performance degradation in a virtual world environment. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory and/or storage system (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a computer-implemented method for managing server performance degradation in a virtual world environment. In this case, a computerized infrastructure can be provided and one or more systems for performing the process steps of the invention can be obtained (e.g., created, purchased, used, modified, etc.) and deployed to the computerized infrastructure. To this extent, the deployment of a system can comprise one or more of (1) installing program code on a computing device, such as computer system from a computer-readable medium; (2) adding one or more computing devices to the computer infrastructure; and (3) incorporating and/or modifying one or more existing systems of the computer infrastructure to enable the computerized infrastructure to perform the process steps of the invention.

In another embodiment, the invention provides a business method that performs the process steps of the invention on a subscription, advertising, and/or fee basis. That is, a service provider, such as a solution integrator, could offer to provide a solution for managing server performance degradation in a virtual world environment. In this case, the service provider can create, maintain, and support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for managing server performance degradation in a virtual universe (VU) having one or more regions, the VU having at least one VU server assigned to serve the one or more regions, at least one of the regions having one or more residents therein, the method comprising:
    determining server load on a VU server;
    determining whether the server load has exceeded a prespecified server load threshold;
    if the server load has exceeded the prespecified server load threshold, reducing the server load by performing at least one of the following: reducing a level of detail in geometries transmitted from the VU server, reducing a number and complexity of textures, and removing a set of residents from the one or more regions of the virtual universe;
    determining if a server failure is imminent; and
    if a server failure is imminent, providing a notification to the residents of the one or more regions, wherein residents with a higher priority are alerted to the imminent failure of the server prior to residents with a lower priority.

2. The method as defined in claim 1 further comprising determining the server load at prespecified time intervals to determine if the server load over the prespecified time intervals is following one of a one or more prespecified server load patterns, and, if the server load over the prespecified time intervals is following one of a one or more prespecified server load patterns, reducing the server load.

3. The method as defined in claim 1 further comprising examining failure notification settings of the one or more residents.

4. The method as defined in claim 3 further comprising sending a failure notification based upon the failure notification settings, the failure notification settings indicating a relative priority for receiving the notification by each of the one or more residents.

5. The method as defined in claim 4 wherein one of the failure notification settings is text, the method further comprising sending the failure notification by text to at least one of the residents.

6. The method as defined in claim 4 wherein one of the failure notification settings is audio, the method further comprising sending the failure notification by audio to at least one of the residents.

7. The method as defined in claim 4 wherein one of the failure notification settings is graphics, the method further comprising sending the failure notification graphically to at least one of the residents.

8. The method as defined in claim 1 wherein the VU has one or more avatars further comprising:
    determining if the server load is nearing the prespecified server load threshold;
    if the server load is nearing the prespecified server load threshold, determining if any avatars have requested entrance to any of the one or more regions served by the VU server; and,
    if any avatars have requested entrance to any of the one or more regions served by the VU server and the server load is nearing the prespecified server load threshold, denying entry to the avatars that have requested entrance to any of the one or more regions served by the VU server.

9. The method as defined in claim 1 further comprising measuring a wall time for a prespecified VU server operation by the VU server and storing in a memory.

10. The method as defined in claim 9 further comprising retrieving from the memory an acceptable wall time for the VU server operation.

11. The method as defined in claim 10 further comprising calculating a threshold difference between the retrieved acceptable wall time and the measured wall time.

12. A virtual universe (VU) server having a system for managing server performance degradation in a virtual world environment in a virtual universe (VU) having one or more avatars, the VU server for managing activity of the one or more avatars, the system comprising:
    a server load detection unit;
    a memory, the memory having thresholds that specify acceptable server performance degradation characteristics, wherein the server load detection unit uses the thresholds to determine whether the VU server performance has degraded below an acceptable threshold, wherein one of the thresholds is based on a current server load within one or more regions of the virtual universe and a number of avatars en route to the one or more regions of the virtual world; and
    an autonomic protection unit configured to reduce the server load if the VU server performance has degraded below the acceptable threshold based on a number of avatars currently within one or more regions of the virtual universe and a number of avatars en route to the one or more regions of the virtual world by performing at least one of the following: reducing a level of detail in geometries transmitted from the VU server, reducing a number and complexity of textures, and removing a set of residents from the one or more regions of the virtual universe.

13. The VU server as defined in claim 12 further comprising a failure notification unit for notifying the avatars if the server load detection unit determines that the VU server performance has degraded below an acceptable threshold.

14. The VU server as defined in claim 13 further comprising failure notification priorities stored in memory wherein the failure notification unit uses the failure notification priorities to determine how the avatars have chosen to be notified and to prioritize a relative order for receiving the notification by each of the avatars, wherein residents with a higher priority are alerted to the imminent failure of the server prior to residents with a lower priority.

15. A computer program product embodied in a non-transitory computer readable medium for operating in a system comprising a processing unit, a memory, a bus, and input/output (I/O) interfaces, for implementing a method for managing server performance degradation in a virtual universe (VU) having one or more regions, the VU having at least one VU server assigned to serve the one or more regions, at least one of the regions having one or more residents therein, the method comprising:
    determining server load on a VU server;
    determining whether the server load has exceeded a prespecified server load threshold;
    if the server load has exceeded the prespecified server load threshold, reducing the server load by performing at least one of the following: reducing a level of detail in geometries transmitted from the VU server, reducing a number and complexity of textures, and removing a set of residents from the one or more regions;

determining if a server failure is imminent; and if a server failure is imminent, providing a notification to the residents of the one or more regions, wherein residents with a higher priority are alerted to the imminent failure of the server prior to residents with a lower priority.

16. The computer program product embodied in a non-transitory medium as defined in claim 15 further comprising determining the server load at prespecified time intervals to determine if the server load over the prespecified time intervals is following one of a one or more prespecified server load patterns, and, if the server load over the prespecified time intervals is following one of a one or more prespecified server load patterns, reducing the server load.

17. The computer program product embodied in a non-transitory medium as defined in claim 16 further comprising examining failure notification settings of the one or more residents to determine a relative priority for sending the notification to each of the one or more residents.

18. A method for deploying computing infrastructure, comprising integrating computer-readable code into a computing system, wherein the code in combination with the computing system is capable of performing a process of managing server performance degradation in a virtual universe (VU) having one or more regions, the VU having at least one VU server assigned to serve the one or more regions, at least one of the regions having one or more residents therein, the process comprising:

determining server load on a VU server;

determining whether the server load has exceeded a prespecified server load threshold;

if the server load has exceeded the prespecified server load threshold, reducing the server load by performing at least one of the following: reducing a level of detail in geometries transmitted from the VU server, reducing a number and complexity of textures, and removing a set of residents from the one or more regions;

determining if a server failure is imminent; and if a server failure is imminent, providing a notification to the residents of the one or more regions, wherein residents with a higher priority are alerted to the imminent failure of the server prior to residents with a lower priority.

19. The method as defined in claim 18 wherein the process further comprises determining the server load at prespecified time intervals to determine if the server load over the prespecified time intervals is following one of a one or more prespecified server load patterns, and, if the server load over the prespecified time intervals is following one of a one or more prespecified server load patterns, reducing the server load.

20. The method as defined in claim 19 wherein the process further comprises examining failure notification settings of the one or more residents to determine a relative priority for sending the notification to each of the one or more residents.

* * * * *